H. A. BEAL.
AXIS FINDER FOR OPTICAL LENSES.
APPLICATION FILED JUNE 5, 1916.
1,202,470.
Patented Oct. 24, 1916.
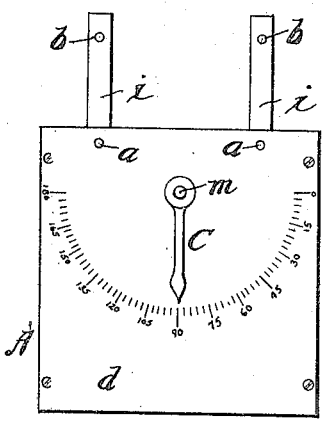
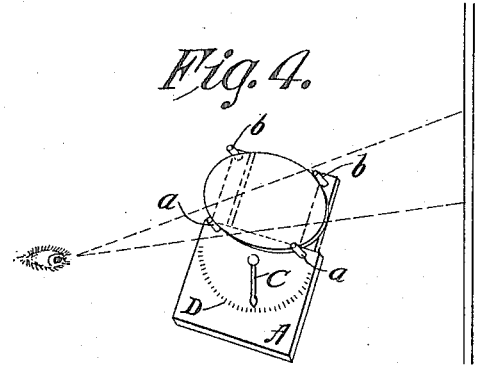
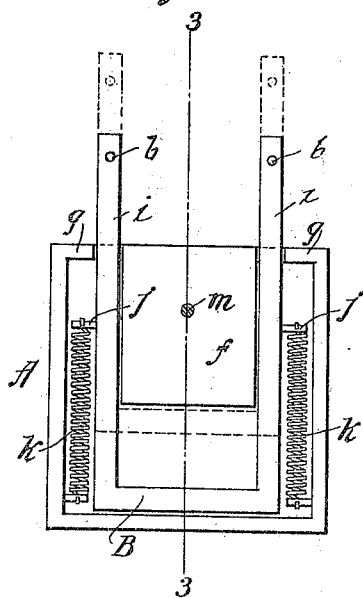
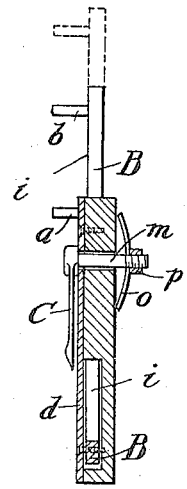
WITNESS:
J. V. Page
INVENTOR,
Herman A. Beal,
BY
ATTORNEY.

UNITED STATES PATENT OFFICE.

HERMAN A. BEAL, OF STAMFORD, CONNECTICUT.

AXIS-FINDER FOR OPTICAL LENSES.

1,202,470.  Specification of Letters Patent.  Patented Oct. 24, 1916.

Application filed June 5, 1916. Serial No. 101,703.

*To all whom it may concern:*

Be it known that I, HERMAN A. BEAL, a citizen of the United States of America, and resident of Stamford, in the county of Fairfield and State of Connecticut, have invented certain new and useful Improvements in Axis-Finders for Optical Lenses, of which the following is a full, clear, and exact description.

As well known, cylindrical, spherical, and compound lenses, so termed, are variously ground or produced, to meet different exigencies, in such manner that the chord line of the arc corresponding to the convexity of the lens may be perpendicular to a line truly radial from the center or axis from which the curvature or convexity is generated, or such line instead of being truly radial from the axis and perpendicular to the chord line, may be slightly or very much angular to such perpendicular line.

Lenses so ground that the chord line is perpendicular to a line which is radial from the axis of the lens will on being looked through and held with the short axis vertically, register with, or show no distortion or deflection from a truly vertical gaging line; but a lens so ground that the chord line is otherwise than a 90 degree angle or perpendicular to the radius line, on being looked through, if held with its short diameter axis vertically, will show a distortion or deflection of the truly vertical gaging line observed through the lens.

It is, therefore, the object of this invention to provide a device in which lenses, usually of elliptical form, may be centered, and by quick observation through the lens in connection with a vertical gaging line, determine, by a degree indicating scale and gravitative pointer, the angularity on which the lens is ground relatively to the lens axis.

The lens testing device includes a frame provided with means by which lenses may be centered thereon, and having a pendulous pointer, and a degree indicating scale with which the said pointer may register for showing the perpendicular position of the frame and lens, and for measuring the angle from such perpendicular to which the frame and lens may be tilted to an extent to cause a rectification of the vertical gaging line as such line is viewed through the lens.

The invention is described in conjunction with the accompanying drawings and is set forth in the claims.

In the drawings:—Figure 1 is a front view of the testing or indicating device. Fig. 2 is a front view showing the device as seen with the front plate thereof removed and exposing parts covered and concealed thereby. Fig. 3 is a central vertical section through the device as taken on line 3—3, Fig. 2. Fig. 4 is a perspective view for diagrammatically illustrating the manner of use of the device.

In the drawings, A represents the frame, body, or stock of the device having near the upper edge thereof a pair of forwardly projecting studs $a$ $a$, arranged in a horizontal line and at equal distances from the central vertical line of the device.

B represents a member slidable on or in the frame and having portions extending above the frame, which extended portions are provided with a pair of studs $b$ $b$ arranged in a horizontal line and at equal distances aside from the vertical median of the device, and which pairs of studs $b$ $b$ and $a$ $a$ have arrangements corresponding to the corners of a rectangle. By placing an elliptical lens, to rest, by its lower edge, on the studs $a$ $a$ and adjusting the studs $b$ $b$ to contacting engagements against the upper edge of the lens, the latter will be "centered", that is its long diameter will be horizontal and parallel with the horizontal edges of the frame, and its short diameter, of course, at right angles thereto.

The slidable member B, as represented, is made of approximately a U or yoke form, or one comprising portions forming three sides of a rectangle. The said slidable member B is fitted between the front plate $d$ and the back of the frame A, and guides are formed therefor by the spacing block $f$ and the margins of the flange-like upper portions $g$ $g$ of the frame back or body, the inner ends of which portions $g$ are spaced from the vertical edges of the rectangular spacing block $f$. The vertical limbs $i$ $i$ of the slidable member B have projecting pins $j$ $j$, to which the upper ends of the spiral springs $k$ $k$ are attached, the lower ends of such springs having connections within the hollow body of, and to, the frame A. The member B may be forced upwardly as far as necessary, against the reaction of the springs and then permitted to be drawn down with yielding pressure on the lens for the centering thereof. The frame is provided with a pendulous or gravitative pointer C, the axis pivot *m* therefor being in the central vertical line of the frame and preferably toward the upper edge of the frame. This pointer has a flat metal, slightly bowed, tensioning spring *o* in yielding resistance between a shoulder *p* on the rear end of the pivoted stud and the back surface of the frame, so that the pointer may swing with all required freedom, yet without undue looseness. By having the shoulder *p* constituted in the form of a nut screw engaged on the rear end of the pivot stud, the tension may be nicely regulated for its most satisfactory and practical action.

D represents a scale composed of graduated degree indicating marks arranged in the form of a semicircle or other arc of a circle, on the front face of the frame and with which graduation marks the pointer registers. As shown, these graduaations indicate from zero at the right to 180 at the left, with figures, as 45, 90, and 135 between the zero and 180 of degree marks. When the frame is exactly vertical the pointer C will register with the 90 degree graduation; and accordingly as it may be tilted more or less, its inclination from the vertical will be shown in degrees by the registration of the pointer, always vertical, with the marks of the scale. Lenses, cylindrical, spherical or compound, ground in accordance with a prescription order, and supposed, for instance, to call for, or be so produced for, a deflection of 75 degrees or 105 degrees, will be centered within the pairs of studs *b b* and *a a*, and the device with the lens therein will be held before the eye and the tester in looking through the lens in conjunction with a gaging line at a suitable distance away, known to be truly vertical, will then tilt the frame and lens until the apparent distortion or deflection of the line is rectified, that is until the portion of the line seen through the lens and angular to the portions of the line above and below the lens comes to coincidence and continuity with the portions of the line above and below the portions seen through the lens.

If the lenses so tested are truly ground according to requirement, the pointer will register on 75 or 105 accordingly as the device is tilted to the right or the left; but if the lenses are produced otherwise than to the given stated figures, such will be shown by the pointer and indicating scale and the tester will govern himself accordingly.

If the prescription calls for a lens to be normal, or 90, the portion of the vertical gaging or testing line which is observed through the lens will be seen as coincident and continuous with the portions of the line above and below that seen through the lens, the pointer at such time registering 90 on the scale of degrees. These two examples of tests are only those given at random, as the angularity of the axes of all lenses may be similarly tested; and, of course, it will be apparent that this device is equally useful for ascertaining the angularity of any lens axis when such, or the supposed angularity, is not assumed or known.

The principle on which lenses are ground is so well known to opticians, optometrists and oculists that the manner of use of the present device for the measurement or testing of the angularity of the lens axis will be most simple and readily understood, while appreciation of the simplicity and convenience in use of the device will be accorded thereto.

I claim:—

1. A device for testing optical lenses by determining the angularity of a line from the axis of the lens relatively to the chord line of the lens, consisting of a frame having transversely projecting studs, and a member, slidable on the frame and provided with studs, the stationary and movably carried studs being operative for centering the lens, and said frame having a pendulous pointer pivoted to maintain a vertical position under any tilting of the carrying frame, and a scale on the frame, indicating degrees of a circle, and with which the pointer registers.

2. A device for testing optical lenses by determining the angularity of a line from the axis of the bars relatively to the chord line of the lens, consisting of a frame having a pair of oppositely located transversely projecting studs, near its upper edge, and a member, slidable on the frame, and having a portion extending above the upper edge of the frame, which extended portion is provided with a pair of studs, the stationary and movably carried studs having arrangements corresponding to the corners of a rectangle and operable for centering the lens, spring means for forcing the slidable stud carrying member downwardly relatively to the frame, and said frame having a pendulous pointer pivoted to maintain a vertical position under any tilting of the carrying frame, and a scale on the frame, indicating degrees of a circle, and with which the pointer registers.

Signed by me in presence of two subscribing witnesses.

HERMAN A. BEAL.

Witnesses:
A. GRUNLICH,
ADELAIDE E. TYNES.